United States Patent [19]

Harris, Jr. et al.

[11] Patent Number: 5,016,554

[45] Date of Patent: May 21, 1991

[54] LINE STORAGE REEL FOR BOAT FENDERS, RESPECTIVELY, BOAT FENDERS EQUIPPED WITH LINE STORAGE REELS

[75] Inventors: Rano J. Harris, Jr., Baton Rouge, La.; Nicholas E. Barker, Seattle, Wash.

[73] Assignee: Romar Technologies, Inc., Baton Rouge, La.

[21] Appl. No.: 501,243

[22] Filed: Mar. 29, 1990

[51] Int. Cl.$^5$ .............................................. B63B 59/02
[52] U.S. Cl. .................................... 114/219; 114/220
[58] Field of Search ................. 441/3, 4, 5; 114/218, 114/219, 230, 343, 345; 405/212, 213

[56] References Cited

U.S. PATENT DOCUMENTS

| 68,251 | 8/1867 | Sniffin | 114/220 |
| 3,292,566 | 12/1966 | Russell | 114/219 |
| 4,280,435 | 7/1981 | Loomis | 114/219 |
| 4,788,926 | 12/1988 | Ullman et al. | 114/219 |
| 4,823,724 | 4/1989 | Lumpkin | 114/219 |
| 4,875,427 | 10/1989 | Harris | 1.4/219 |

*Primary Examiner*—Sherman D. Basinger
*Assistant Examiner*—Stephen P. Avila
*Attorney, Agent, or Firm*—Llewellyn A. Proctor

[57] ABSTRACT

A boat fender provided with a reel about which the line, or rope, from which the boat fender is normally suspended when in use, is wound for containment and storage when such line, or rope, is not in use. The storage reel provides a means for the quick, facile storage of the line used to suspend the fender, and for release of the line as required.

16 Claims, 5 Drawing Sheets

LINE STORAGE REEL FOR BOAT FENDERS, RESPECTIVELY, BOAT FENDERS EQUIPPED WITH LINE STORAGE REELS

FIELD OF THE INVENTION

This invention relates to novel boat fenders. In particular, it relates to a boat fender line storage reel combination which provides a means for the quick, facile storage of the line used to secure the fender, and for release of all or a portion of such line for the normal use of the boat fender.

BACKGROUND

Devices made of some form of resilient material have long been employed on various types of watercraft as "boat fenders", to serve as a cushioning mechanism when such watercraft are likely to come into physical contract with adjacent docks, pilings, piers, other watercraft. On heavy commercial vessels and fishing boats, tugboats, trawlers, and the like, such fenders often take the form of used automotive tires lashed together and suspended over the side if the vessel, to prevent damage which might result from contact with docks, piers, moorings or other vessels. On pleasure craft, from small runabouts to larger cruisers and yachts, cushioning boat fenders are also widely utilized to prevent damage from contact with adjacent structures or other vessels, which fenders are generally of more sophisticated designs and constructions. Presently used boat fenders are of many shapes, designs and colors. Typical boat fenders are often of elongate or spherical shape, and the other surface is usually smooth, to provide an aesthetically pleasing appearance to the eye, and to prevent marring or damage to the surfaces of the vessel on which they are used. Boat fenders are commonly constructed of an elastomeric material, typically a flexible or semi-flexible plastic, e.g., a heavy gauge polyvinyl chloride, vinyl plastisol, or similarly flexible and resilient resin; sometimes with ends of solid polyvinyl chloride, vinyl plastisol, or similar materials, for greater strength and reinforcement in highly stressed areas. Most are hollow and inflatable to better absorb shocks, bumps or jolts, although occassionally fenders may be constructed of a solid elastomeric or resilient foam material. Many are designed, or shaped, to roll instead of rubbing against the vessel's hull sides, thereby maximizing protection to the hull. Some fenders are provided with covers of cloth fabric or other materials, in order to preserve the appearance of the fender itself, as well as to further minimize the likelihood of the fender causing damage to the hull. Many are designed to hang vertically, horizontally, or attached together to increase the area of protection without resorting to the use of fender boards. Usually, fenders are suapended from the rails on the deck of a vessel, from the gunwales, or from attachments on the hull sides. Various types of ropes are used as fender lines to suspend fenders, and attachment to the point of suspension is usually effected by tying a knot to fasten the line to the suspension point, or by equipping the end of the line with an eye-splice loop which is then set over a hook or cleat or other similar hardware device to hold the line.

One difficulty with present boat fenders is that the rope hangs from the fender in unsightly and potentially dangerous fashion when the fender is removed from use and is stored. Fenders are often stored in metal racks on the deck of a vessel, and even when secured in such racks or in a compartment, the full loose length of the rope used to fasten the fender to the rail, post, or cleat during normal use can hang from the fender and often falls into piles on the deck or floor of the storage area, thus presenting, at best, an unsightly appearance not in keeping with proper shipboard housingkeeping, and representing a potential tripping or entanglement hazard to passersby.

U.S. Pat. No. 4,875,427, which was issued Oct. 24, 1989, to Rano J. Harris, Jr., discloses apparatus intended to deal with the problem of loose or unsightly attachment lines on boat fenders by creating a cavity within a boat fender for storage of such lines. The present invention is an improvement thereover, providing a solution to the line storage problem in simpler and more reliable form.

OBJECTS

It is, accordingly, a primary object of this invention to provide an improved boat fender with the capability of neat and tidy storage of the fender attachment line upon such fender within a rope storage spool, or reel, located at and attached to one or both ends of said fender.

In particular, it is an object of this invention to provide an improved boat fender in the form of a line storage reel, or spool, which, when affixed to a boat fender, or when incorporated as a component of a boat fender, will provide space for and otherwise enable the neat, quick, and facile storage and retrieval of the line used to attach the fender, particularly whenever the fender and such line are not in normal use, and which will present an aesthetically pleasing appearance.

A further and more specific object is to provide means for retaining or securing the rope in place within the storage area provided by a line storage reel for a boat fender, whether such reel is in the form of a separate member integrated into an existing boat fender to improve its utility and change its character, or constructed ab initio as an integral component of a new boat fender.

THE INVENTION

These objects and others are achieved in accordance with the present invention, characterized as apparatus embodying a line storage device, or reel, which, when affixed to or incorporated within one or both ends of an existing boat fender, provides a line storage chamber within which the rope used to attach the fender during normal use can be stored, and preferably also embodying associated means for quick facile inmput of rope to the chamber, as well as quick facile release and retrieval of rope from the chamber for normal use of the boat fender.

The typical elongate boat fender, which in normal use is hung alongside the vessel by a rope from one end of the fender or from both ends, to suspend it either vertically or horizontally, respectively, from a rail or other hitching device on the vessel, is comprised of an enclosing shell, or wall, providing a body of three-dimensional shape, the external surface of which contacts the mooring site or adjacent vessel for protection of the hull. In the present invention an external spool, or reel, preferably a non-rotatable spool, or reel, located at one or both ends of the enclosing wall, is adapted to contain rope in amounts sufficient for normal suspension of the fender, as well as in excess or reserve amounts, in order to provide a place and associated means for the storage of the rope when the boat fender, or one or more of its attaching ropes or lines, is not in use, and for retrieval of the rope for use in deploying the fender in normal use.

The characteristics of preferred line storage reels for boat fenders, as well as boat fenders incorporating such line storage reels, and their principle of operation, will be more fully understood by reference to the following detailed description, and to the attached drawings to which reference is made in the description. The various features and components in the drawings are referred to by numbers, similar features and components being represented in the different views by similar numbers. Subscripts are used in some instances with numbers, and with numbers and letters, where there are duplicate features and components, or to designate a sub-feature or component of a larger assembly.

In the drawings.

FIG., 8 depicts in perspective a boat fender of elongate shape having a tab-shaped end on each end and equipped with a cross-hole for attachment of a rope or line, which fender is provided with a third type or external rope storage reel which is installed over an end tab of the fender and held in place by a retaining or clamping ring.

Figure 1:
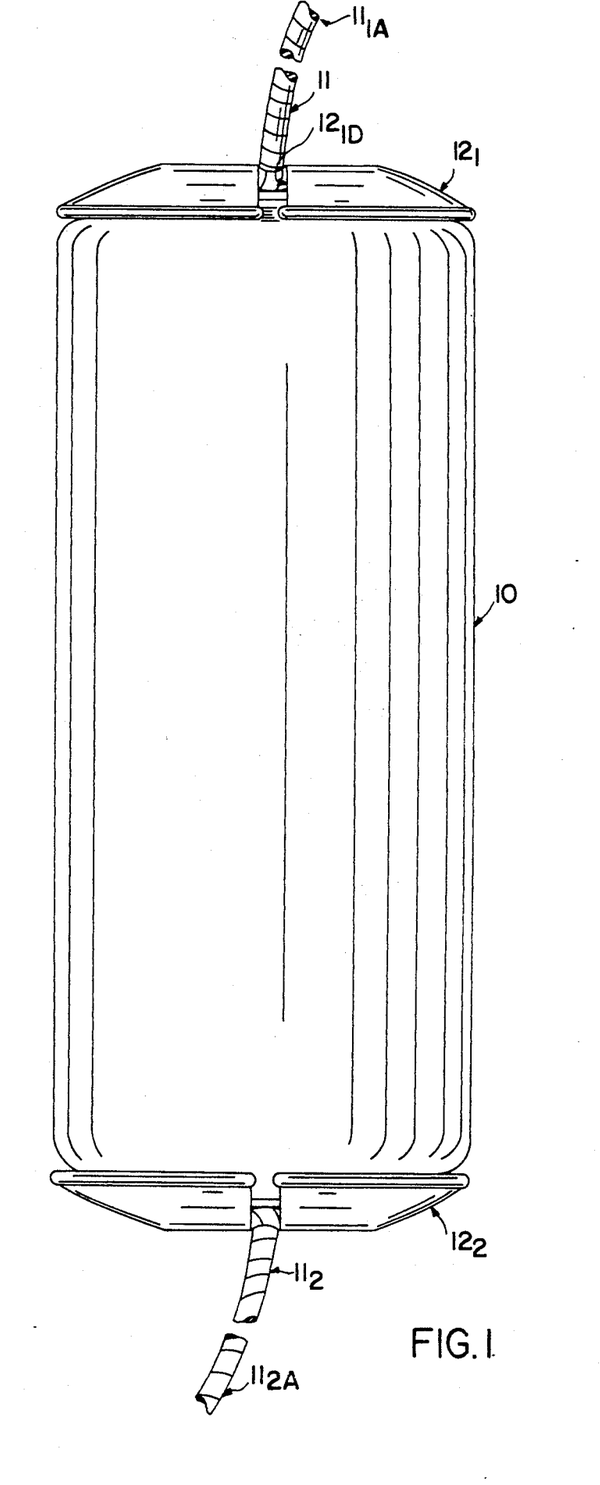
FIG. 1 depicts in perspective a boat fender of elongate shape and having a center hole allowing for rope passage, and provided with external rope storage devices, in the form of line storage spools, or reels, one located at each end of said boat fender.
Figure 2:
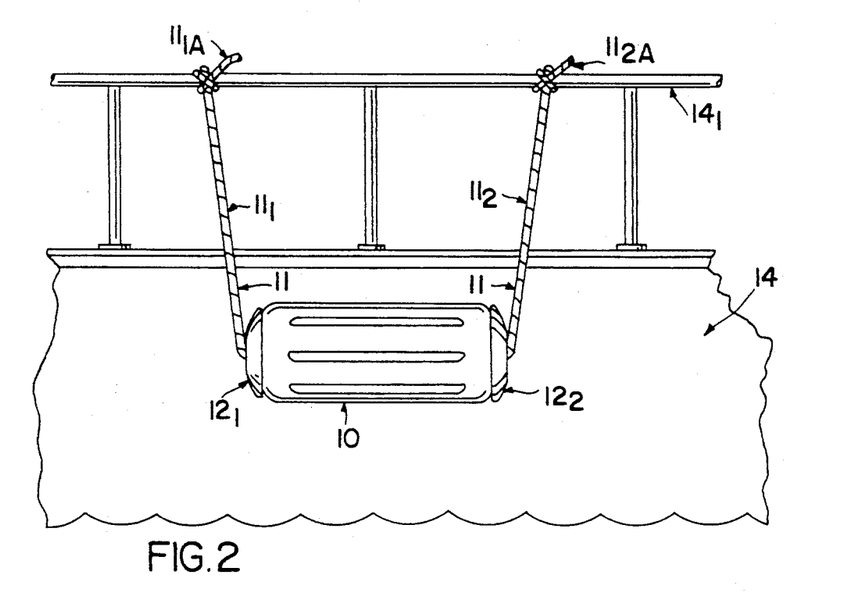
FIG. 2 depicts in perspective a boat fender of the type depicted by reference to FIG. 1, as such fender is typically deployed for normal use in a horizontal orientation by suspension from ropes attached to the bow rail of a vessel.
Figure 3:
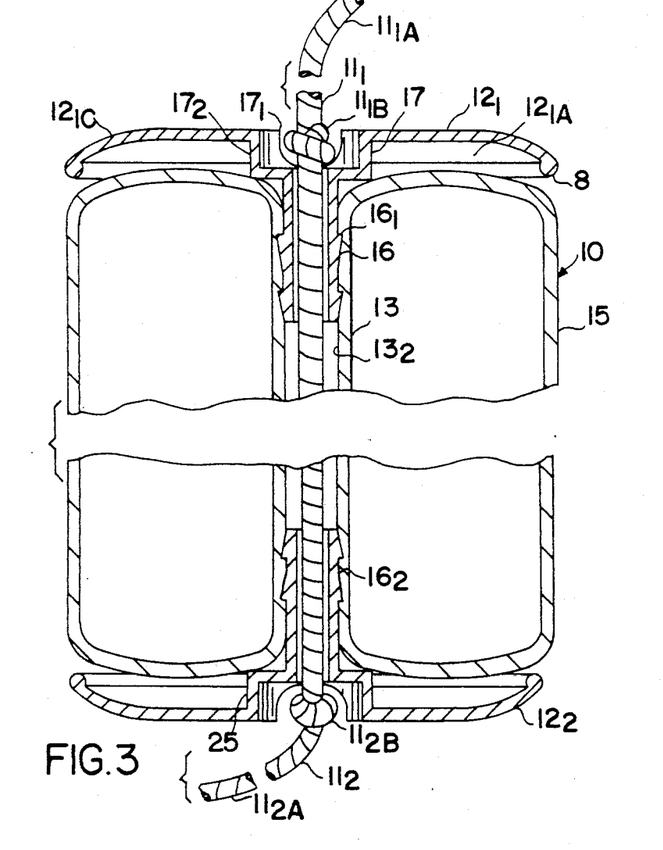
FIG. 3 is a cross-sectional view of the boat fender depicted by reference to FIG. 1, showing the two external line storage reels and means by which such reels may be attached to the fender.

Referring to the drawings, reference is made made to FIGS. 1–3; initially to FIGS. 1 and 2, generally. FIGS. 1 and 2 show a preferred type of boat fender 10 of elongate shape, equipped with storage reels $12_1$, $12_2$ located at each end, from which reels a section of rope $11_1$, $11_2$, respectively, can be withdrawn for suspension of the boat fender 10 alongside the hull of a vessel 14. For vertical suspension of the boat fender 10 from the rail $14_1$ of a vessel 14, a needed length of one segment, e.g., $11_1$, of the rope 11 can be released from its external storage reel, e.g., $12_1$, and its terminal end, e.g., $11_{1A}$, secured to a post rail, e.g., $14_1$, cleat or other hitching device located on the deck or sides of the vessel 14. For horizontal suspension of the boat fender 10 from the rail $14_1$ of the vessel 14, the needed lengths of rope $11_1$, $11_2$ are released from the chambers provided by external line storage reels $12_1$, $12_2$, and the rope ends $11_{1A}$, $11_{2A}$ are secured to a post, rail $14_1$, cleat, or hitching device on the deck or sides of the vessel 14.

The outside surface of a boat fender 10 can be virtually any texture, color, or design, and the shape can vary widely. An elongate shape is very practical, and generally preferred. Circumferential longitudinally-oriented projections along the outside surface of a boat fender 10 are often provided, as depicted in FIG. 2, to maintain the boat fender stationary in its desired position without rolling along the side of the vessel under normal circumstances; however, such projections are normally of a size small enough to allow the fender to roll along the side of the craft under unusual circumstances, as when forces exerted upon the vessel by wave action or other causes result in large movements of the vessel relative to adjacent structures of other vessels, under which circumstances projections which are too large could impair the ability of the fender to roll, possibly resulting in surface marring of the vessel or possibly other damage from the displacement and resultant improper positioning of the fender.

Figure 4:
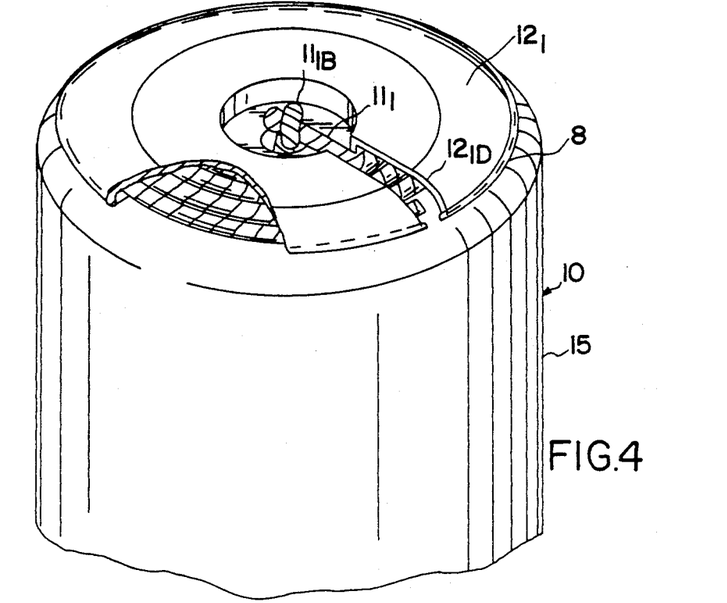
FIG. 4 depicts a fragmentary sectional view of one of the line storage reels depicted by reference to FIG. 1 and FIG. 3, inclusive of a flexible lip enclosure around the circumference of the chamber, for retaining all or a portion of the rope in place within the storage chamber provided by the reel, and for permitting the release of the stored rope as required.

Reference is specifically made to FIGS. 3 and 4. The core portion of the boat fender 10 is constituted of an inner tubular structure 13, located concentrically within a surrounding outer wall 15. Into the tubular structure 13 is inserted the tubular central mounting stem 16 of the line storage reel $12_1$. The outer circumference of the mounting stem 16 is equipped with a series of projecting members $16_1$ of a size and shape designed to fit very tightly into the inner central bore of inner tubular structure 13, and to mate with the inner central wall $13_2$ of said tubular structure 13 in such a way that the projecting members $16_1$ grip and bind to such inner wall $13_2$ to retain and hold the line storage reel $12_1$ in place, forming an essentially permanent mechanical attachment of the line storage reel $12_1$ to the fender.

A section $11_1$ of rope or line 11 of a size small enought to pass smoothly without interference through both the inner tubular structure 13 and the tubular mounting stem 16 is passed through one end of the fender and through said tubular structure 13 and mounting stem 16, thence into the enlarged tubular section 17 of the line storage reel $12_1$, where a knot $11_{1B}$ is tied in the rope 11 at the point at which section $11_1$, which is of a length which is sufficient for mounting the fender 10 in normnal applications, remains free. Such section $11_1$ may then be employed to suspend the fender 10 from an attachment point on a craft, or, when such fender 10 or rope section $11_1$ are no longer deployed for normal use, said rope section $11_1$ may then be laid over to pass through a slot $17_1$ in the wall $17_2$ of the enlarged tubular section 17, and then through a channel $12_{1D}$ which penetrates the outer flange $12_{1C}$ of the line storage reel $12_1$. Beginning with the portion of the rope section $11_1$ which is nearest the slot $17_1$ in the enlarged tubular section 17, the rope $11_1$ is then wound, turn-by-turn, as best illustrated by reference to FIG. 4, around the circumference of the reel $12_1$ and pulled toward the center, or hub, of the reel with each turn as it is wound. As the rope is wound, it deflects the flexible outer lip 8 at the edge of the reel $12_1$ and enters the confines of the chamber $12_{1A}$ created between the outer wall 15 of the fender 10 and the flange $12_{1C}$ of the reel. As winding of the rope $11_1$ continues, the rope is drawn into concentric coils within the chamber $12_{1A}$ around the wall $17_2$ of the enlarged tubular section 17. When the end $11_{1A}$ of the rope $11_1$ is reached, it is inserted into the chamber $12_{1A}$ by deflecting the lip 8, which lip hold the coils of rope $11_1$ within the chamber $12_{1A1}$. In order to retrieve and uncoil the line for deployment of the fender 10, the user inserts a finger, or fingers, into the channel $12_{1D}$ and pulls the outermost coil, e.g., $11_{1C}$, of line 111 outward, away from the center of the reel $12_1$, thereby causing the end $11_{1A}$ of the line $11_1$ to be removed from the chamber $12_{1A}$, and allowing the remainder of the line $11_1$ to be unwound, one coil at a time, from the chamber $12_{1A}$, until all of the rope $11_1$ is removed.

It will be observed, in the embodiment shown, that the rope 11 extends through the tubular structure 13 and mounting stem 16, but is knotted, for convenience, at the two ends of the tubular structure 13, within the enlarged tubular sections 17, 25 of the reels $12_1$, $12_2$, to permanently anchor the rope 11 in place. Thus the knots $11_{1B}$, $11_{2B}$ can serve to anchor the rope in place, effectively causing the rope 11 to function as two independent units, a first rope segment $11_1$ emanating from tubular section 17 and anchored via a knot $11_{2B}$ in tubular section 25 at the opposite end of the fender, and a second rope segment $11_2$, emanating from tubular section 25 and anchored via a knot $11_{1B}$ in tubular section 17. In other words, a rope segment (e.g., $11_1$) can be withdrawn from the chamber $12_{1A}$ formed by the line storage reel $12_1$, to the full extent of the length of rope $11_1$ stored within such chamber, and thereafter it will remain secured to the fender because it is held thereto via knots $11_{1B}$, $11_{2B}$ which cannot pass through the smaller diameter tubular sections 17, 25, or tubular structure 13. It is, of course, apparent that other means of securing the rope segments in place within the tubular sections 17, 25 are possible, and, while highly desirable in many applications, it is not essential that the length of rope be segmented in this fashion at all. The two terminal ends of the rope 11 may be formed as permanent loops or eye-splices, at least one of which would be installed after one plain end (e.g., $11_{1A}$) has been passed through the central tubular structure 13, mounting stems $16_1$, $16_2$, and tubular sections 17, 25, although it is obviously apparent that it is not essential to provide any such loop or other termination in the ends $11_{1A}$, $11_{2A}$ of rope 11. It will be further understood, however, that the inner bores of tubular structure 13, mounting stems $16_1$, $16_2$, and tubular sections 17, 25 could all be of relatively uniform diameter from end to end, and knots or other rope-positioning means omitted; or, in a less preferred form, such inner bores could be omitted altogether, and the rope affixed directly to the line storage reels $12_1$, $12_2$, and stored within the confines of the chambers $12_{1A}$, $12_{2A}$.

Figure 5:
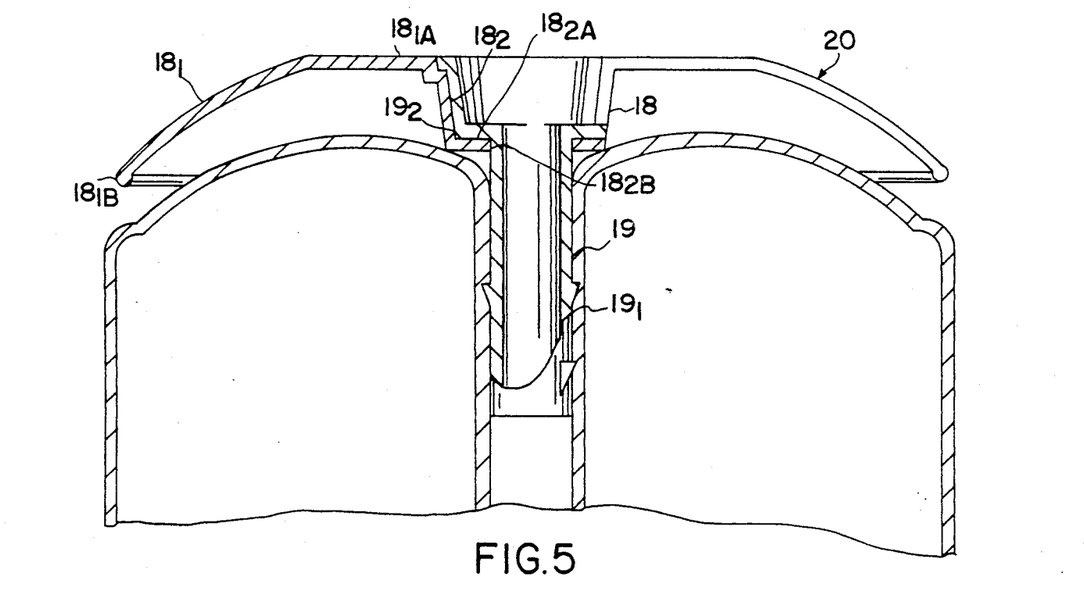
FIG. 5 is a fragmentary cross-sectional view of a second type of external line storage reel for attachment to a boat fender of elongate shape and having a center hole allowing for rope passage, such line storage reel being constructed of two parts, an inner, central mounting tube member with a mounting boss or flange, and an outer reel hub and flange member.

FIG. 5 depicts a line storage reel 20 of a design to permit attachment to a boat fender of elongate design having a central hole through the fender, similar to fenders described by reference to FIGS. 1 through 4. The storage reel 20 is constituted of a larger, outer reel flange and hub assembly 18, and a smaller, central mounting flange and stem assembly 19. The outer reel flange assembly $18_1$ of flexible or semi-flexible material, generally formed as a molded component, consists of an outer main flange portion (e.g., $18_{1A}$) which is equipped with a flexible outer lip (e.g., $18_{1B}$) and a central, inner tubular section (e.g., $18_2$) provided with a bottom, inner flange (e.g., $18_{2A}$) equipped with a central through-hole (e.g., $18_{2B}$). The mounting flange and stem assembly 19, of rigid or semi-rigid material, serves as a means of attaching the reel flange assembly 18 to the fender, and is constituted of a tubular stem section (e.g., $19_1$) and a larger mounting flange or boss section (e.g. $19_2$). The stem section $19_1$ is of a size small enough to pass through the inner flange $18_{2A}$, and appropriate to achieve a snug fit withing the inner tubular section of a boat fender. The stem section $19_1$ is further provided with fully- or partially-circumferential projections of a shape and size to permit easy passage into the inner tubular section of the boat fender, and configured in such a way as to firmly grip and bite into the flexible inner walls of the inner tubular section, creating a non-removable attachment. When the stem section $19_1$ is passed first through the hole $18_{2B}$ of inner flange $18_{2A}$ of the reel flange 18, and then into the inner tubular section of the fender to the maximum depth possible, the inwardly facing, or lower, face of flange or boss section $19_2$ comes firmly into contact with the outwardly facing, or upper, face or the inner flange $18_{2A}$, thereby retaining the reel flange 18 in position in firm contact with the end of the fender, creating a line storage chamber between the end of the fender and the inner surface of flange $18_1$, and thereby constituting a line storage reel 20. It will be observed, in the embodiment shown, that the mounting stem $19_1$ is equipped with a series of circumferential, wedge-shaped projections which serve as barbs to grip the inner wall of the inner tubular section of the fender, to hold the reel assembly 20 in place. It is, of course, apparent that other sizes, shapes, and configurations or positionings or projections are possible, and it is not essential that such projections take the form depicted in FIGS. 3 and 4, nor is it essential that any projections at all be provided on the outer surface of the stem section $19_1$. Although such projections are generally preferred, it will be readily apparent that other means of affixing the stem section permanently in place exist, such as the use of appropriate adhesive compounds. Once installed on the fender, the function of the line storage reel 20 depicted in FIG. 5 is similar to the reels depicted by reference to FIGS. 1 through 4

Figure 6:
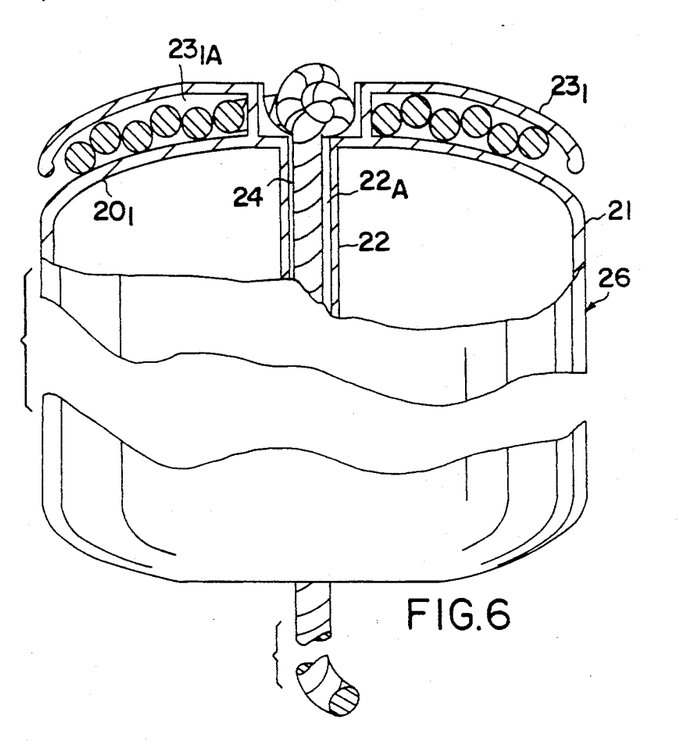
FIG. 6 is a fragmentary sectional view of an elongate inflatable boat fender having a center hole from one end to the other allowing rope passage, which fender is equipped with a line storage reel positioned outside one end wall of the main cavity, which reel is constructed as an integral component of the fender.

FIG. 6 depicts a boat fender 26 of elongate design, constituted of a surrounding outer enclosing wall 21 and a central core comprised of an inner tubular section 22 which is provided with a central hole $22_A$ of a size suitable to permit the passage of a rope, or line (e.g., 24) used to suspend the fender during normal use from a cleat, post, rail, hook, ring, or other attachment means on a vessel, and equipped with a line storage chamber (e.g., $23_{1A}$) external to the outer enclosing wall 21, formed within the area enclosed by the line storage reel (e.g., $23_1$) located at the end $20_1$ of the fender 20. The rope storage reel $23_1$ is similar in design and function to those described by reference to FIGS. 1 through 4, except that this member $23_1$ is constructed as an integral part of the fender, of the same materials of construction as the fender, instead of as a separate device attached to the fender. The outer enclosing wall 21 of flexible or semi-flexible material forms a unitary body with the line storage reel $23_1$. The enclosing wall 21 and the fender reel $23_1$ are generally formed as molded components, and where an inflatable boat fender is desired, then a gas needle valve (not shown) is included within the wall of the boat fender for injection of a pressurized gas.

Figure 7:
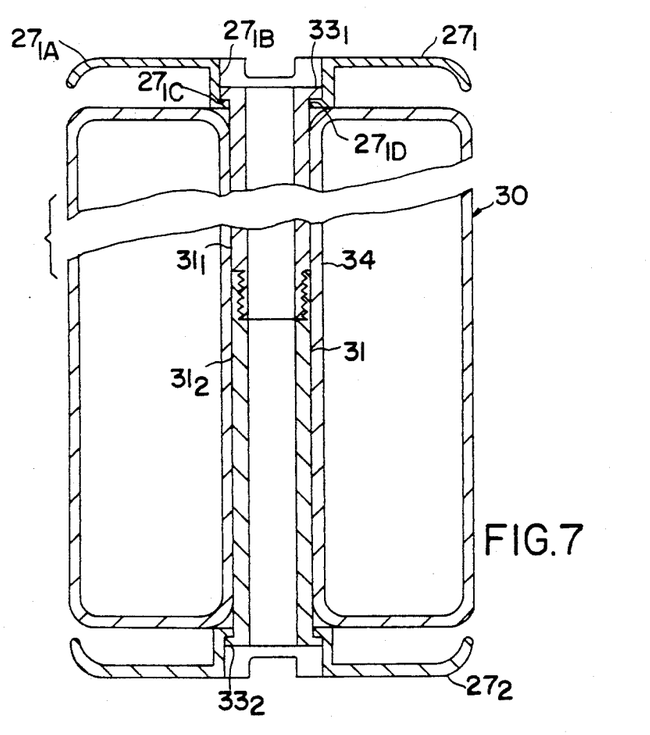
FIG. 7 is a cross-sectional view of a fender and the line storage reels depicted by reference to FIGS. 1 and 2, which line storage reels are attached to the fender by means of a central tubular connecting member provided with means to join the reels at opposite ends of the fender together and to hold them in place independently of any need to grip, bind, or otherwise attach to the inner wall of the center through-hole of the fender.

FIG. 7 depicts another means of attachment of a line storage reel to a fender having a central hole. In this embodiment, as it will be observed, the outer flange portion $27_{1A}$ and central tubular portion $27_{1B}$ of the reel 27 are essentially similar in design and function to the line storage reels depicted by reference to FIGS. 1 through 4. However, in the device described by reference to the figure, the means of attachment of the reel to the fender 30 is not a mounting stem as depicted by reference to FIGS. 3 through 5, but is instead, constituted of a connecting tube (e.g., 31) which passes through the bore of the inner tubular section 34 of the fender 30 and, extending form one end to the other, connects the two reels $27_1$, $27_2$, holding them in place against the respective ends of the fender where they are installed. The tubular connecting member $31_1$, it will be observed, is equipped with a larger flange portion(e.g., $33_1$) at one end, which flange portion fits within the inner bore of the ventral tubular section $27_{1B}$ of the outer reel flange member $27_1$. The inwardly facing face of the flange portion $27_{1B}$ comes into contact with the outwardly facing face $27_{1C}$ of the lower flange $27_{1D}$ of the central tubular section $27_{1B}$ of the outer reel flange member $27_1$, and serves to hold the reel firmly against the end of the outer wall $30_1$ of the fender 30 when the tubular connecting member $31_1$ is passed through the fender and attached to the opposite tubular connecting member $31_2$. It will be observed, in this embodiment, that the tubular connecting members are fitted with mating threads which join the tubular connecting members together within the inner tubular section 34 of the fender 30. When the threads 35 of the tubular connecting members $31_1$, $31_2$ are tightened together, the respective mounting flanges $33_1$, $33_2$ at each end of the fender are drawn closer together, thereby pulling the line storage reels into place and holding them firmly against the two ends of the fenders. Provisions for use of a rope as a suspension line, knotting of the rope or use of other means to secure the rope, and other functional characteristics of the line storage reels constructed and assembled as depicted are essentially similar to those line storage reels as depicted by reference to FIGS. 1 through 4. It will be understood, however, that while the tubular connecting member 31 is shown equipped with threaded attaching means and mounting flanges, for convenience, it is obvious that other means for joining the two line storage reels to the tubular connecting member may be employed, and that, indeed, the line storage reels themselves may be fitted with threads or other mating cavities or projections to connect directly to threads, projections, or cavities on the tubular connecting member, to hold the reels in place without any need for mounting flanges.

Figure 8:
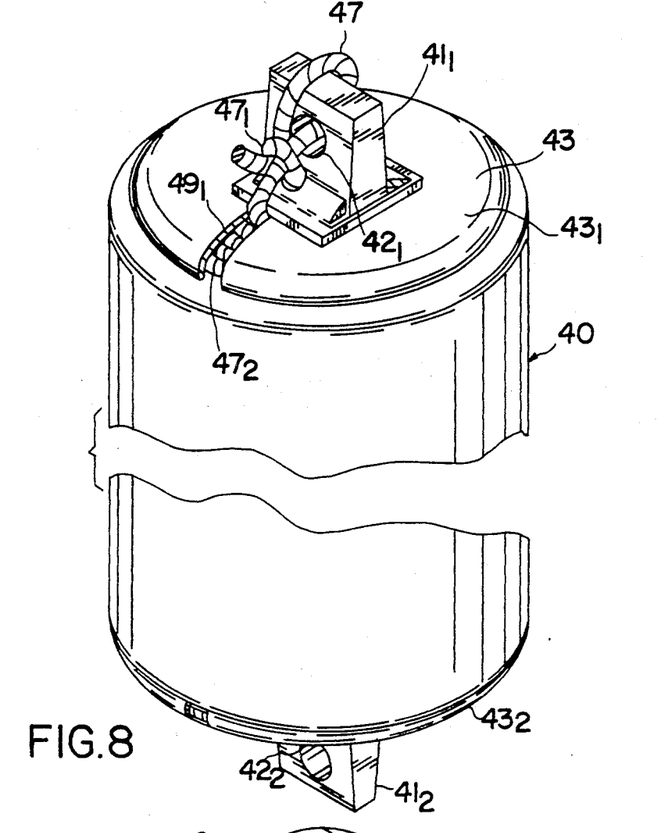
Figure 9:
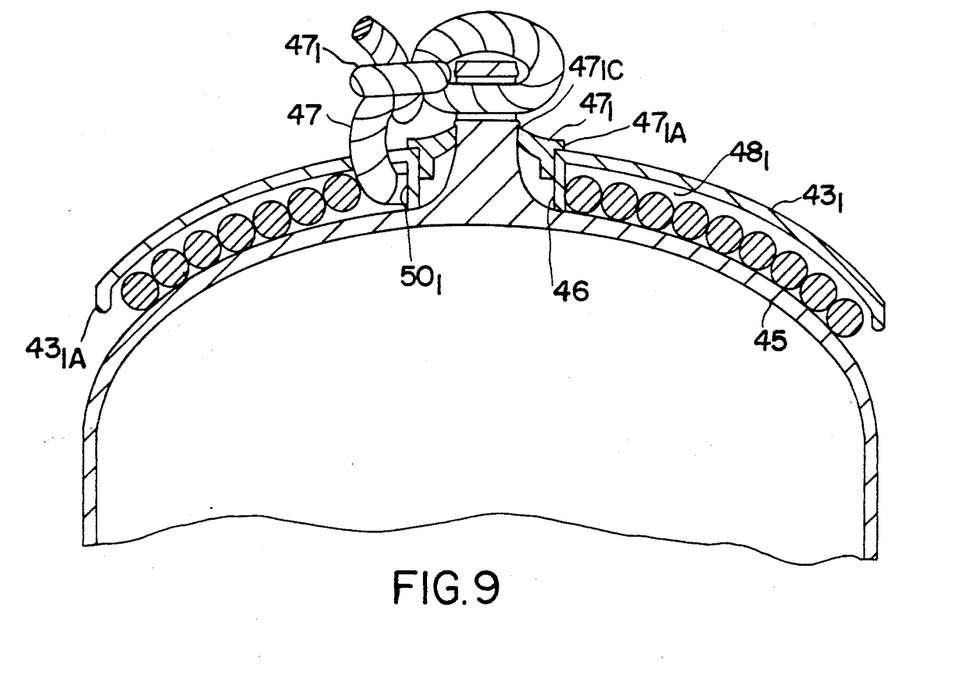
FIG. 9 is a cross-sectional view of the fender and the line storage reel and associated retaining means depicted by reference to FIG. 7.

FIGS. 8 and 9 depict another type of line storage reel for use with another type of boat fender 40. In the device described by reference to the figures, the fender 40 is of a closed elongate shape, having flattened tabs $41_1$, $41_2$ molded onto one or both ends, which tabs are equipped with a cross-hole $42_1$, $42_2$ through which a rope used for suspension of the fender from a cleat, post, rail, ring, or other attachment point on a vessel may be passed and attached to the fender by means of a knot, eye-splice, or other retaining means. The line storage reel 43 is comprised of an outer reel flange member $43_1$, $43_2$ and an inner retaining member 44. In this embodiment the outer flange member $43_1$ likewise forms a rope storage chamber between the inner face $43_{1A}$ of the outer flange and the end of the outer enclosing wall 45 of the fender. The device is installed upon the fender by first placing the outer flange mamber onto the end of the fender such that the tab $41_1$ passes through and is approximately centered within the inner, central tubular section 46 of the outer flange member $43_1$. The outer flange member is then positioned and held in place by installation of the inner retaining member $47_1$, which is of a size and shape to fit snugly into the cavity provided by the central tubular section 46 of the outer flange member $43_1$, and is equipped with an upper protruding lip section $47_{1A}$ of a larger size than the opening of the central tubular section and designed to hold the flexible or semi-flexible outer flange in place against the end of the fender. It will be observed, in this embodiment, that the inner retaining member, of rigid or semi-rigid material, is constructed such that the parallel inner side sections $47_{1C}$ of the member adjacent the tabs are shaped as gripping members and configured so as to create an interference fit with the fender tab and to deflect outward when placed over the tab, but to deflect inward, gripping the tab, in response to any outwardly-directed force which would tend to cause removal of the member; thus, the retaining member is placed over the tab and forced inward, toward the fender, and into the cavity provided by the central tubular section 46 of the outer flange member $43_1$, thereby gripping the tab and holding the outer flange member in firm contact with the end of the fender and comprising a line stroage reel. It will be apparent that numerous other means of securing the outer flange member in place can be employed, although the embodiment shown is preferred for convenience. Upon completion of the installation of the line storage reel upon the fender, the rope 47 used as a suspension line is passed through the cross-hole $42_1$ and secured by a knot, eyesplice, or other retaining means. Subsequently, the line may be deployed for normal use of the fender, or it may be stored within the chamber $48_1$ provided by the line storage reel 43, by laying-over the section of rope adjacent to and nearest the knot $47_1$, or other rope-securing means, into the channel $49_1$ provided in the outer flange member and out to the outer circumference of the flange, and then by winding the rope around the central hub $50_1$ of the reel, deflecting the flexible lip $43_{1A}$ at the outer edge of the flange $43_1$ as the rope is wound in successive coils. When the end of the rope is reached it is pushed under the lip into the storage chamber $48_1$ of the reel 43, where the lip prevents it from falling out. Retrieval of the rope, in order to deploy the fender for normal use, is effected by grasping the outermost coil of rope $47_2$ visible in the channel $49_1$ and pulling it outward to free the end of the rope. Thereafter, the remainder of the rope may be unwound one coil at a time until it has all been removed, whereupon the rope is ready for use in suspending the fender.

Various modifications and changes can be made to the line storage reel, and to fenders equipped with line storage reels, and associated means for providing the capacity, in an external storage chamber, to store the line used to suspend boat fenders, without departing the spirit and scope of this invention, as will be apparent to those of skill in this art.

Having described the invention what is claimed is:

1. A boat fender for suspension from a line alongside the hull of a craft from a hitching device located on the craft for protection of the hull on contact thereof with a mooring site, which comprises
    a body constituted of an enclosing wall providing a substantially central opening of generally tubular shape, and an object of three-dimensional shape, the external surface of which can contact said mooring site for protection of the hull,
    a line storage reel having a stem which can be projected within said central opening and affixed to said body about which said line can be wound, turn-by-turn for containment and storage of the suspending line when the boat fender is not in use, and a cover is provided thereover creating in effect a chamber within which said wound line is contained, hidden and stored.

2. The apparatus of claim 1 wherein the stem, the reel, and the outer circumferential edge of the cover is flexible to yield to the line passed thereunder and wound upon the reel.

3. The apparatus of claim 2 wherein the cover is notched from the circumference inwardly to provide a slot through which said line can be passed to facilitate essentially complete winding of the line upon the reel, and facilitate easy removal of the end of the wrapped line for withdrawal and unwinding from the reel.

4. The apparatus of claim 1 wherein a substantially central opening of generally tubular shape is provided by the enclosing wall, a hollow stem having a lower small diameter shank portion for affixing within said central opening for anchoring said hollow stem therein and an upper large diameter flange portion provided with an upwardly-faced rim, and a cover comprising a flange of larger outer diameter than said flange portion of said hollow stem provided with a central opening with a downwardly faced rim, said cover held in place by passage of the lower diameter shank portion of the hollow stem therethrough and projection thereof into the central opening for affixing same in place to create in effect a chamber within which said wound line is contained, hidden and stored.

5. The apparatus of claim 4 wherein the external circumference of the lower small diameter shank portion of the hollow stem is provided with circumferential projections directionally inclined to permit easy passage on insertion into the central opening, and configured to firmly grip and bite into the wall surrounding said opening for permanent attachment of the hollow stem therein.

6. The apparatus of claim 4 wherein the cover is notched from the circumference inwardly to provide a slot through which said line can be passed to facilitate essentially complete winding of the line upon the reel, and easy removal of the end of the wrapped line for withdrawal and unwinding from the reel.

7. A boat fender for suspension from a line alongside the hull of a craft from a hitching point located on the craft for protection of the hull on contact thereof with a mooring site or other craft, which comprises
    a tubular body with flanged terminal ends, constituted in sections secured together via threaded connections,
    a wall enclosing said tubular body providing a generally central opening outside which the flanged terminal ends are projected, the external surface of the wall of which can contact said mooring site for protection of the hull, and
    a pair of reels, each provided with a central opening, held in alternately disposed position by passage of said tubular body through said central openings such that the flanged ends thereof rest against and retain in place each of the reels on which said suspending line can be wound turn-by-turn for containment and storage when the boat fender is not in use.

8. The apparatus of claim 7 wherein the outer end wall of each of the reels is a large diameter flanged member and constitutes a cover over each of the reels creating in effect chambers within which said wound line is contained, hidden and stored.

9. The apparatus of claim 7 wherein the boat fender is of elongate shape, the tubular body extends through a central opening constituting the major axis of the the boat fender, and the outer end flange of each reel constitutes a cover over each of the reels creating in effect chambers within which said wound line is contained, hidden, and stored.

10. The apparatus of claim 9 wherein a reel is provided with an inner central hub portion and an outer flanged portion which constitute a unitary assembly forming a cover, and the outer circumferential edge of a cover is flexible to yield to a line passed thereunder and wound upon a reel.

11. The apparatus of claim 10 where a cover flange is notched from the circumference inwardly to provide a slot through which said line can be passed to facilitate essentially complete winding of the line upon a reel, and facilitate easy removal of the end of the wrapped line for withdrawal and unwinding from a reel.

12. A boat fender for suspension from a line alongside the hull of a craft from a hitching point located on the craft for protection of the hull on contact thereof with a mooring site or other craft, which comprises
    a body of three-dimensional shape the external surface of which can contact said mooring site or other craft for protection of the hull,
    a tab projecting from said body and secured thereto, inclusive of an eye to which an end of the line can be secured, and
    a line storage reel, provided with a central opening through which said tab is passed and secured to said tab, about which said line can be wound for containment and storage of the suspending line when the boat fender is not in use.

13. The apparatus of claim 12 wherein a reel is provided with a central hub portion and an outer flange portion of larger diameter extending outwardly toward the outer edge of the fender constituting a cover creating in effect a chamber within which said wound line is contained, hidden, and stored.

14. The apparatus of claim 13 wherein the cover and reel mounted on said tab constitute a unitary component and the outer circumferential edge of the cover is flexible to yield to the line passed thereunder and wound upon the reel.

15. The apparatus of claim 14 wherein the cover is notched from the circumference inwardly to provide a slot through which said line can be passed to facilitate essentially complete winding of the line upon the reel, and facilitate easy removal of the end of the wrapped line for withdrawal and unwinding from the reel.

16. The apparatus of claim 14 wherein the cover and reel component is secured in place upon the projecting tab by a retaining clamp affixed upon the tab above the cover and reel component.

* * * * *